United States Patent [19]

Moran, III; John L. et al.

[11] Patent Number: 5,463,661

[45] Date of Patent: Oct. 31, 1995

[54] TX PREEMPHASIS FILTER AND TX POWER CONTROL BASED HIGH SPEED TWO WIRE MODEM

[75] Inventors: John L. Moran, III, Millville; Manickam R. Sridhar, Holliston, both of Mass.; William L. Brown, Mississauga, Canada

[73] Assignee: Motorola, Inc., Schaumburg, Ill.

[21] Appl. No.: 393,611

[22] Filed: Feb. 23, 1995

[51] Int. Cl.$^6$ ........................................ H04L 5/16
[52] U.S. Cl. .................. 375/222; 375/296; 370/32.1
[58] Field of Search ............................ 375/222, 285, 375/295, 296, 377, 257, 204; 379/406, 410, 411, 93, 97; 370/24, 32.1; 333/18, 28 R, 151

[56] References Cited

U.S. PATENT DOCUMENTS

| | | | |
|---|---|---|---|
| 4,887,278 | 12/1989 | Gupta | 375/296 X |
| 4,924,492 | 5/1990 | Gitlin et al. | 370/32.1 X |
| 5,029,167 | 7/1991 | Arnon et al. | 370/32.1 |
| 5,163,044 | 11/1992 | Golden | 370/32.1 |
| 5,317,596 | 5/1994 | Ho et al. | 370/32.1 |
| 5,329,495 | 6/1994 | Shenoi et al. | 379/406 |
| 5,396,519 | 3/1995 | Betts et al. | 375/296 |

*Primary Examiner*—Stephen Chin
*Assistant Examiner*—Tesfaldet Bocure
*Attorney, Agent, or Firm*—Darleen J. Stockley

[57] ABSTRACT

A two wire modem 200, 500, 600 and a method 1000, 1100 select a carrier frequency and a symbol rate from a predetermined plurality of carrier frequencies and symbol rates to communicate with another modem over a communication media in a full duplex mode based on signal and echo characteristics of the communication media estimated by the modem.

16 Claims, 11 Drawing Sheets

TX PREEMPHASIS FILTER AND TX POWER CONTROL BASED HIGH SPEED TWO WIRE MODEM

FIELD OF THE INVENTION

The present invention relates to modems, in general, and more particularly to a modem for selecting a carrier frequency, a symbol rate, a transmit preemphasis filter and transmitted power level from a predetermined plurality of carrier frequencies, symbol rates, transmit preemphasis filter and transmitted power level.

BACKGROUND OF THE INVENTION

In a data communication network, digital data among other data, may be-communicated at a data signaling rate from one modem to another modem through a communication media, which may be a leased line of the network or a dial up connection of a general switched telephone network (GSTN), for example. Generally, modems operate at a fixed carrier frequency and a fixed symbol rate and attempt to optimize the data signaling rate based on the conditions of the communication media over which they are communicating. In order to accomplish an optimum data signaling rate, contemporary modems, International Telecommunication Union, Telecommunications Standardization Sector(ITU-T) Recommendation V 0.34, utilize a startup learning procedure before commencing communication during which the modems perform certain predefined start up procedures which include a line probing sequence, for example, to establish the media characteristics over which communication will take place. The current state of the art ITU-T standard for two wire full duplex modems is V 0.34 . An example of a modem employing the V 0.34 standard today includes the Motorola Codex Model 3260 Fast.

Two wire modems for operating in a full duplex mode generally employ an echo canceller to cancel from the received signal any near end and far end echoes resulting from its concurrent signal transmissions. Further, in two wire, full duplex transmission systems, there are system nonlinearities which affect not only the signal transmission, but also both of the near end and far end echoes resulting therefrom. Normally modems do not measure the nonlinearities of the echo signals and, for this reason, cannot provide adequate estimates for preemphasis and transmit power level selection purposes. This measurement is vital for modern modems that are transmitting and receiving at data signaling rates up to 33,600 bits per second. Virtually all known echo cancellers are linear models. This means that any significant non-linearity remains largely uncancelled.

Furthermore the receiver can only resolve non-linear distortion levels to approximately the μ-law or A-law companding quantizing noise limits of the PCM Codec (37–39)dB and therefore has no ability to measure the potential improvement in the remote modem's performance if the transmit level was dropped further. As an example, the receiver can not measure the distortion improvement of the remote end when the remote transmitter lowers the transmit power by one additional dB that would result in a non-linear distortion level improvement from 65 dB to 70 dB. The ability to resolve small but still significant differences in -performance will be crucial to all V 0.34 modems and the future proposed ITU-T Recommendation V 0.34 bis modems operating at data signaling rates greater than or equal to 28.8 kbit/s.

In the present V 0.34 recommendation, there is a provision for the transmitter to allow for a power drop as requested by the receiver, with additional capability for the transmitter to drop power within the receiver recommended tolerance. There is also the provision in the V 0.34 recommendation for selecting the transmitter preemphasis filter.

Hence, there is a need for minimizing the effects of non-linearity in the network. The present invention provides a selection of transmitter preemphasis filters and the transmitter output power that minimizes the effects of non-linearity in the network.

DESCRIPTION OF THE PREFERRED EMBODIMENT

Transmitter preemphasis up to now has only been treated as a receiver equalization technique and not a echo canceller dynamic range extension technique. It is well understood that Transmitter (TX) preemphasis is selected by the receiver to assist in the linear equalization of the receiver, but what has been mostly ignored is that TX preemphasis in and of itself is a form of TX power control but more importantly, it reduces the power in the lower portion of the spectrum in which frequency dependent non-linearity primarily occurs.

This means that TX preemphasis can also be used to minimize the effects of non-linearity in the network. These nonlinearities are primarily caused by transformers. Since a transformer is non-linear at low frequencies (transformer linearity always improves as the frequency increases), lowering the power in the lower portion of the spectrum while raising it in the higher portion of the spectrum will dramatically improve the transformer linearity. This improvement in transformer linearity will have the net result of improving the residual non-linearity in the Near End Echo and thus increase the bit rate of the modem.

Figure 1:
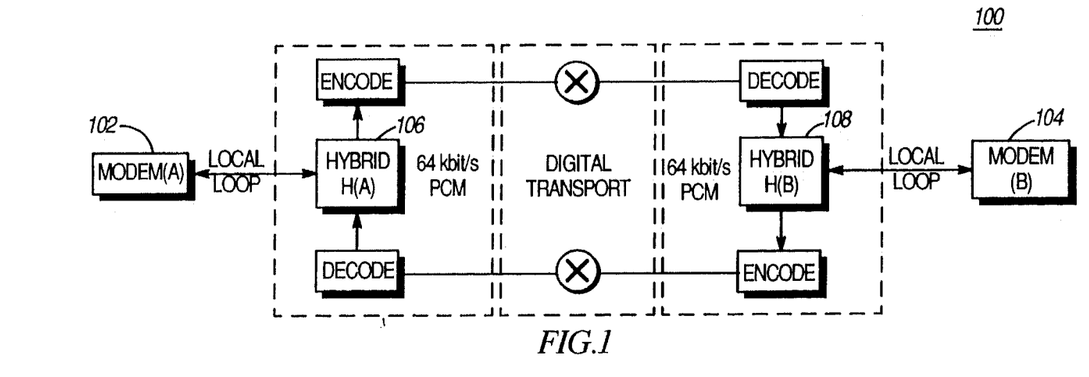
FIGS. 1–2 are block diagram illustrations of an exemplary data communications network model suitable to describe the background environment of the present invention. Shown in these figures are the nonlinearity generators.
Figure 2:
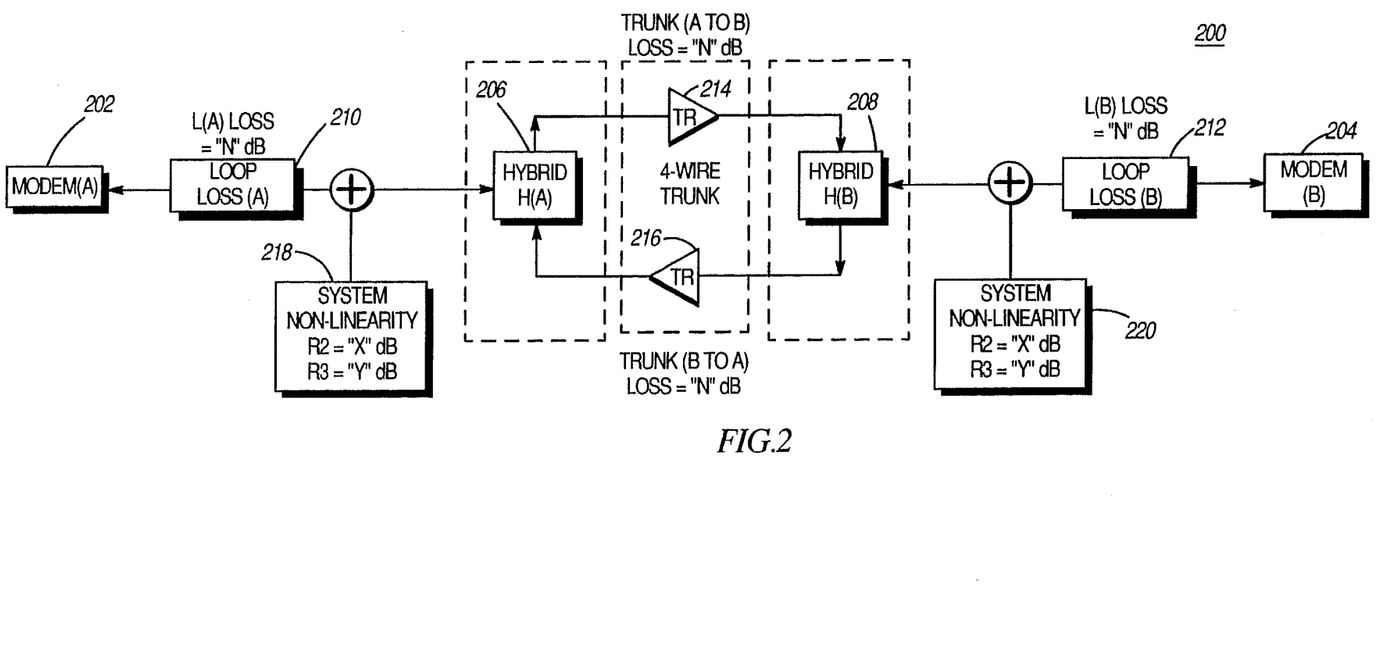

FIGS. 1–2, numerals 100 and 200, are block diagrams of a network connection representation illustrating an exemplary data communications network model in which two modems denoted as A and B, of the two wire variety, are communicating through a general switched telephone network (GSTN). In this example, the modems A 102, 202 and B 104, 204 are coupled to the GSTN over two wire line connections to hybrids H(A) 106, 206 and H(B) 108, 208, respectively, which convert the two wire connections to four wire connections of the GSTN. Loop losses of the two wire connections, coupling modems A 202 and B 204 to the GSTN, are represented by the blocks L(A) 210 and L(B) 212, respectively. The trunk losses of the network are lumped according to direction of signal communication and are represented by the directional triangles TR 214, 216.

FIG. 2 also illustrates, by means of functional blocks 218, 220 the nonlinearity present in a near-end echo signal resulting from the transmitted signal from modem B 204 and reflected from the hybrid H(B) 208.

Figure 3:
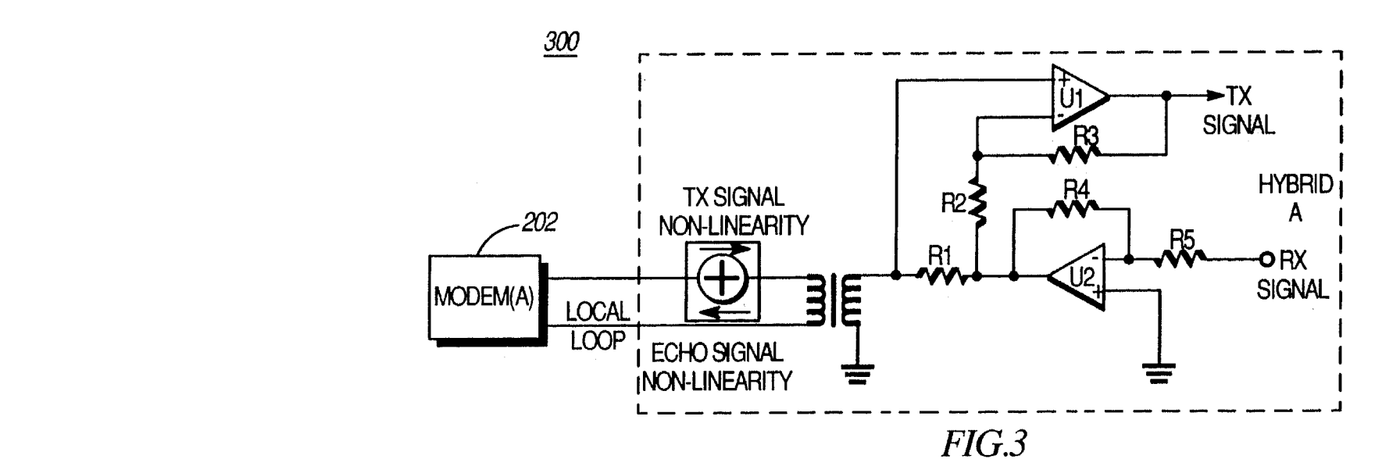
FIG. 3 is a block diagram illustrating a system having a network non-linearity caused by a central office hybrid, a fundamental model for frequency dependent nonlinearity, also called intermodulation distortion.
Figure 4:
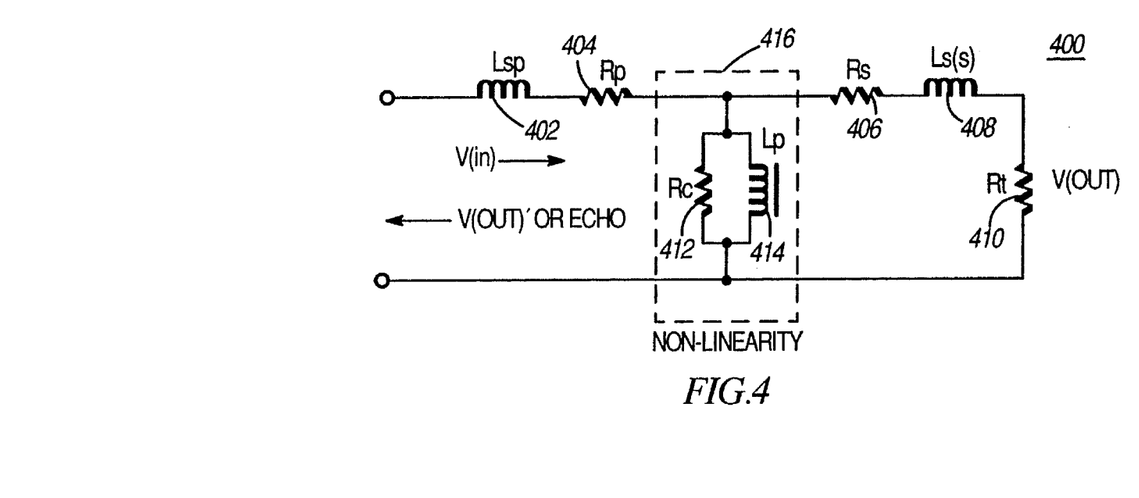
FIG. 4 is a diagram illustrating an electrical equivalent for a transformer, given a system non-linearity created by a central office hybrid.

FIGS. 3–4, numerals 300 and 400, illustrate a network non-linearity caused by a central office hybrid, a fundamental model for frequency dependent nonlinearity, also called intermodulation distortion, and an electrical equivalent for a transformer, given a system non-linearity created by a central office hybrid. Intermodulation distortion (non-linear distortion) results from a system non-linearity. The non-linear representation below is a mathematical model of second and third order distortion, and the distortion is compressive in nature. The formula simply states that given a system non-linearity at the input, there will be at the output of the system, the original input signal and $(N)^2$ second order terms and $(N)^3$ third and second order terms combined. Therefore, given the formula and the four frequency representations below as an example, the output includes the 4 fundamental frequencies and $(4)^2$ or 16 second order distortion products and $(4)^3$, or a total of 64, distortion products comprised of the 16 second order and 48 third order products. Derivation:

$$V_{out} = a_1(V_{in})^1 + a_2(V_{in})^2 + a_3(V_{in})^3$$

where $$V_{in} = A*\cos(w_1)t + B*\cos(w_2)t + C*\cos(w_3)t + D*\cos(w_4)t$$

$$a_1(V_{in})^1 = A*\cos(w_1)t + B*\cos(w_2)t + C*\cos(w_3)t + D*\cos(w_4)t$$

Second Order Distortion - ($R_2$ or $H_2$)

$$\begin{aligned}a_2(V_{in})^2 = (-a_2/2)*[&A^{2*}\cos(2w_1)t + B^{2*}\cos(2w_2)t + \\ &C^{2*}\cos(2w_3)t + D^{2*}\cos(2w_4)t] + \\ -a_2*AB[&\cos(w_1+w_2)t + \cos(w_1-w_2)t] + \\ -a_2*AC[&\cos(w_1+w_3)t + \cos(w_1-w_3)t] + \\ -a_2*AD[&\cos(w_1+w_4)t + \cos(w_1-w_4)t] + \\ -a_2*BC[&\cos(w_2+w_3)t + \cos(w_2-w_3)t] + \\ -a_2*BD[&\cos(w_2+w_4)t + \cos(w_2-w_4)t] + \\ &-a_2*CD[\cos(w_3+w_4)t + \cos(w_3-w_4)t]\end{aligned}$$

There is also a DC term related to $2^{nd}$ order distortion $$DC = (-a_2/2)(A^2 + B^2 + C^2 + D^2)$$

Third Order Distortion - ($R_3$ or $H_3$)

There are both $1^{st}$ & $3^{rd}$ order distortion products that result from $R_3$ or $H_3$.

$1^{st}$ Order Term $$\begin{aligned}-a_3(V_{in})^3 = (3/4)*&-a_3*A[A^2+2B^2+2C^2+2D^2]\cos(w_1)t + \\ (3/4)*&-a_3*B[B^2+2A^2+2C^2+2D^2]\cos(w_2)t + \\ (3/4)*&-a_3*C[C^2+2A^2+2B^2+2D^2]\cos(w_3)t + \\ (3/4)*&-a_3*D[D^2+2A^2+2B^2+2C^2]\cos(w_4)t + \\ (1/4)*&-a_3[A^{3*}\cos(3w_1)t + B^{3*}\cos(3w_2)t + \\ &C^{3*}\cos(3w_3)t + D^{3*}\cos(3w_4)t] + \\ (3/4)*&-a_3[A^2B[\cos(2w_1+w_2)t + \cos(2w_1-w_2)t] + \\ &A^2C[\cos(2w_1+w_3)t + \cos(2w_1-w_3)t] + \\ &A^2D[\cos(2w_1+w_4)t + \cos(2w_1-w_4)t] + \\ &B^2A[\cos(2w_2+w_1)t + \cos(2w_2-w_1)t] + \\ &B^2C[\cos(2w_2+w_3)t + \cos(2w_2-w_3)t] + \\ &B^2D[\cos(2w_2+w_4)t + \cos(2w_2-w_4)t] + \\ &C^2A[\cos(2w_3+w_1)t + \cos(2w_3-w_1)t] + \\ &C^2B[\cos(2w_3+w_2)t + \cos(2w_3-w_2)t] + \\ &C^2D[\cos(2w_3+w_4)t + \cos(2w_3-w_4)t] + \\ &D^2A[\cos(2w_4+w_1)t + \cos(2w_4-w_1)t] + \\ &D^2B[\cos(2w_4+w_2)t + \cos(2w_4-w_2)t] + \\ &D^2C[\cos(2w_4+w_3)t + \cos(2w_4-w_3)t] + \\ (3/2)-&a_3[ABC[\cos(w_1+w_2+w_3)t + \cos(w_1+w_2-w_3)t + \\ &\cos(w_1-w_2+w_3)t + \cos(w_1-w_2-w_3)t] + \\ &ABD[\cos(w_1+w_2+w_4)t + \cos(w_1+w_2-w_4)t + \\ &\cos(w_1-w_2+w_4)t + \cos(w_1-w_2-w_4)t] + \\ &ACD[\cos(w_1+w_3+w_4)t + \cos(w_1+w_3-w_4)t + \\ &\cos(w_1-w_3+w_4)t + \cos(w_1-w_3-w_4)t] + \\ &BCD[\cos(w_2+w_3+w_4)t + \cos(w_2+w_3-w_4)t + \\ &\cos(w_2-w_3+w_4)t + \cos(w_2-w_3-w_4)t]]\end{aligned}$$

Using the above formula, the number of distortion products that result from the V 0.34 Line Probe is determined. There are $(21)^2$ or 441 second order distortion products and $(21)^3$ or 9261 total distortion products with 8820 being third order and the remaining 441 being second order distortion products.

While the mathematical model has been traditionally used for received signal analysis, it can be shown that the same analysis holds true for the distortion analysis of the echo signal. Furthermore, the phenomenon of frequency dependent non-linearity that typically is caused by a transformer (modem or network) results in a condition where not all of the terms would have equal weighting. The lower frequency content of the signal spectrum definitely has more impact on the resulting intermodulation distortion terms than the higher frequency spectral energy. Thus, the transmit spectral shaping (preemphasis) can be used to lower the power of the more dominant frequency components that impact the residual non-linearity of the transmitted echo.

In operation, modem B 204, in communicating with modem A 202, transmits its signal traversing the local loop L(B) 212, the hybrid H(B) 208, the trunk loss TR 216, the hybrid H(A) 206 and the loop L(A) 210, which in combination constitute the communication media between modems A 202 and B 204. Concurrently therewith, modem B 204 receives in a full duplex mode not only the transmitted signal from modem A 202 but, in addition, a near end echo signal and a composite far end echo signal. The spectral characteristics of the communication media is referred to herein as the channel and the round trip delay over the channel between the call and answer modems is referred to herein as the range. Accordingly, in order to provide a viable estimate of the channel characteristics for optimizing data bit rate and echo cancellation, the near and far end echo signals including echo nonlinearities must be learned and taken into consideration in selecting the optimal preemphasis and transmit power level as part of the training sequences at the modems A 202 and B 204.

In the present embodiment, modems A 202 and B 204 are implemented substantially in the same manner as modems marketed as Model 3260 fast by Motorola, Inc. (formerly Codex Corporation), described more fully in the publication "3260 fast Modem Users Manual". This manual(s) is hereby incorporated by reference herein and provides more specific details of the structure and operation of a suitable modem used in connection of this preferred embodiment.

FIG.4 illustrates an example of an electrical equivalent of a transformer that includes an inductor having leakage inductance, Ls(p) 402, from a primary winding and leakage inductance, Ls(s) 408, from a secondary winding, an open circuit inductance Lp 414, a core loss Rc 412 that is frequency dependent, a primary winding resistance Rp 404, a secondary winding resistance Rs 406, and a termination resistance or impedance Rt 410. Rc 412 and Lp 414 cause a non-linearity 416 in the circuit. In the example, the voltage-in, Vin, and voltage-out, Vout, are represented as follows:

$$Vin = A*\cos(w1)t + B*\cos(w2)t + C*\cos(w3)t + ... X*\cos(wn)t$$

$$Vout = a1(Vin)1 + (a2)(Vin)2 + (a3)Vin)**3,$$

where A, B, C, ... X represent the amplitude term, w represents the frequency in radians, n is a preselected positive integer, t represents time in seconds, and a1, a2, and a3 represent the amplitude of the first, second and third order terms of the non-linearity function.

Figure 5:
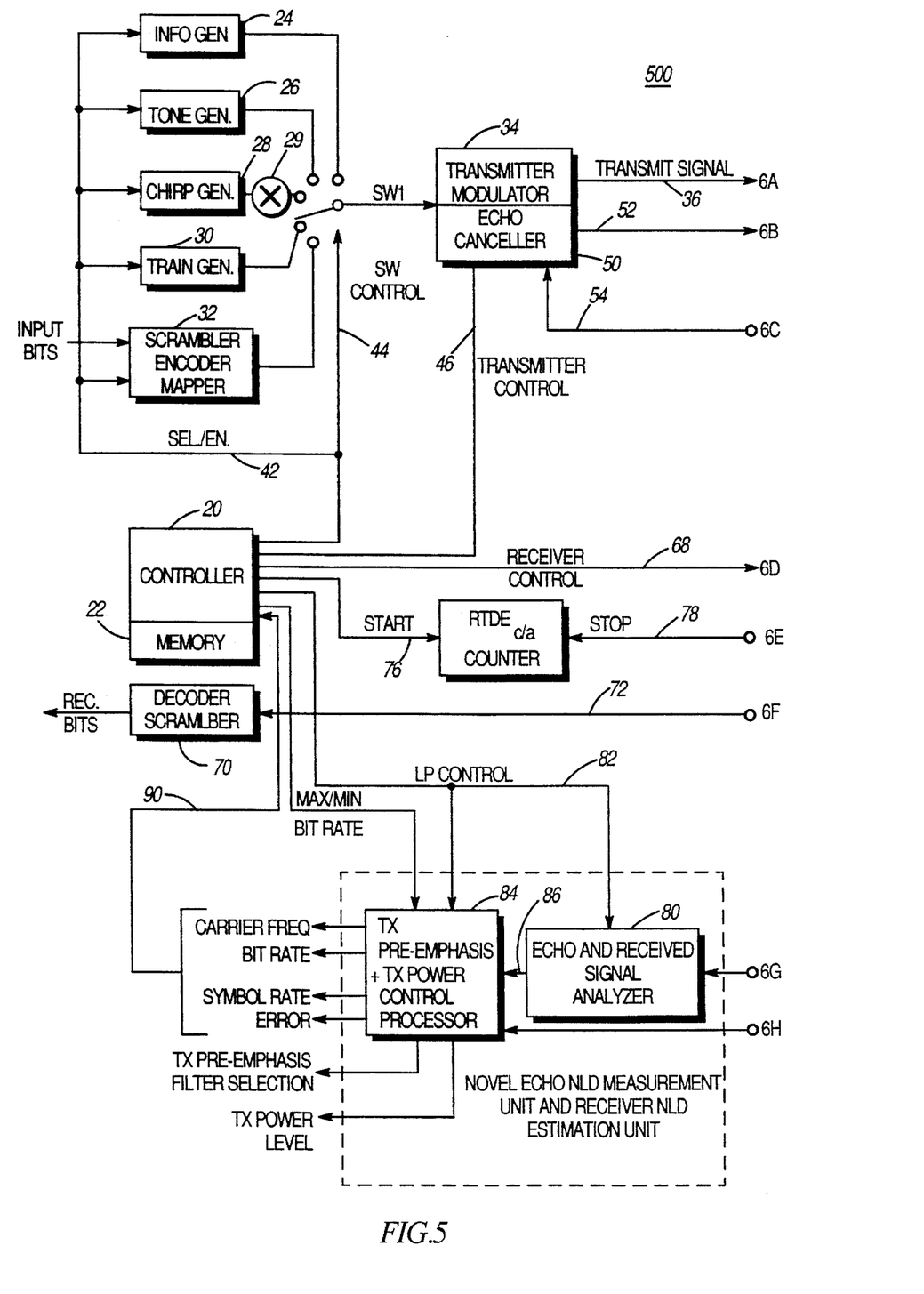
FIGS. 5–6 depict a functional block diagram schematic of a series of functional modules, including an echo and received signal analyzer and a transmit preemphasis and transmit power control processor, for estimation of the echo and recieved signal characteristics of the communication media in accordance with the present invention.
Figure 6:
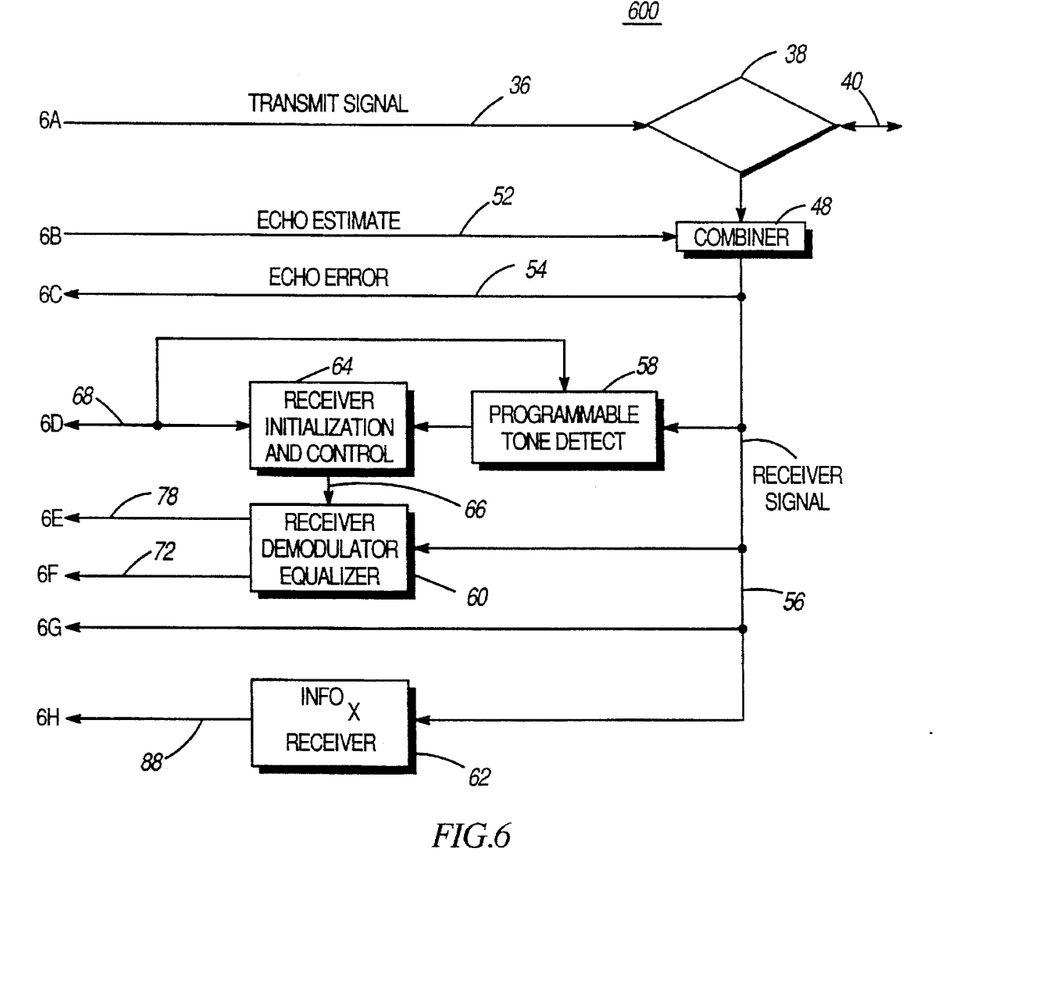

FIGS. 5–6, numerals 500 and 600, depict a functional block diagram schematic of a two wire modem for operating in a full duplex mode and embodying the various aspects of the present invention. As in the Motorola/Codex model 3260 Fast, the function of the blocks of the embodiment of FIG. 5 may be implemented by at least one signal processor similar to the type manufactured for Motorola, Inc., formerly Codex Corporation, bearing Part No. 60423-51, for example. The modem processor(s) will not be described in detail herein as the use of a signal processor(s) in the control and implementation of modem functions is considered well-known.

At the heart of the exemplary modem is a functional controller module 20 which functions to provide information to the various other functional modules of the modem in accordance with a predetermined timing sequence which will be described in greater detail hereinbelow. The present modem is intended to operate with quadrature amplitude modulation (QAM) for each channel with synchronous line transmission at a selected one of the following plurality of modulation or symbol rates: 2400, 2743, 3000, 3200 and 3429 as will be more fully understood from the description herebelow. The present modem is also designed to operate at the following data rates: 2400, 4800, 7200, 9600, 12000, 14400, 16800, 19200, 21600, 24000, and 26400,28800 bits per second. In the present embodiment, the above rates may use the Modulation Scheme, recommended by the ITU-T recommendation V 0.34 Still further, a plurality of carrier frequencies which may be used by the present modem include 1600 Hz, 1646 Hz 1680 Hz ,1800 Hz, 1829 Hz, 1867 Hz, 1920 Hz 2000 Hz and 1959 Hz. A selected carrier frequency and symbol rate from the respective plurality of symbol rates and carrier frequencies, and the transmitter preemphasis filters and the transmitter power level are established during a start up procedure after the line has been probed and the operational bandwidth and nonlinearities in the echo paths thereof established. Information representing the aforementioned predetermined carrier frequencies, symbol rates, transmitter power levels and the transmitter preemphasis filter and data bit rates are all stored in the memory 22 for a selection under control of the controller 20 as will be more evident from the description found below.

It is understood without having to be shown or described that the present exemplary modem includes conventional interchange modem circuits which comply with the functionality and operational requirements of the V 0.24 recommendation of the CCITT and all such interchange circuits are terminated in the corresponding data terminal equipment (DTE) and in the data circuits terminating equipment in accordance with appropriate recommendations for electrical characteristics. In addition, such modems accept and pass synchronous or asynchronous data from and to its corresponding DTE on the appropriate conventional interchange circuit and under control thereof. The timing, clocks ... etc., for example, and data rate selection switching and control are all achieved through the conventional interchange circuits.

Referring again to FIGS. 5–6, the modem includes the following conventional signal generating functional modules: a INFO$_x$ generator 24, a tone generator 26, a chirp signal generator 28, a train signal generator 30 and a conventional scrambler/encoder/mapper function 32 which processes the data to be transmitted. A functional switch SW1 selects the output of one of the generator modules 24, 26, 28, 30 or 32 to be an input to a transmitter/modulator functional module 34 which in turn generates a transmit signal 36. The Gain multiplier 29 serves to control the output level of the chirp generator .The signal 36 is conducted through a hybrid circuit 38 to the two wire connection 40 to either a leased line or dial-up line of a telephone network. The generator functions 24, 26, 28, 30 and 32 are all selected and enabled by the controller 20 via the signal path 42. In addition, the functional switch module SW1 is also controlled by the controller 20 via the switch control path 44. Still further, information related to the carrier frequency, symbol rate, TX preemphasis filter, TX power level and data bit rate along with certain control signals are provided to the transmitter/modulator 34 from the controller 20 over the data and control path 46.

Received signals are passed from the two wire line conductor 40 through the hybrid 38 to a combiner function 48 of the modem. A conventional echo canceller function 50 estimates an echo based on perceived characteristics of the channel in accordance information provided to it from the controller 20 via path 46. The echo canceller 50 provides the echo estimate to the combiner 48 over path 52 so that the received signal may be relieved of its echo component by the combiner 48. An echo error is provided back to the echo canceller 50 over path 54 in order to adjust the echo canceller to a more effective level.

The received signal from the combiner 48 is provided over the signal path 56 to a variety of additional functional modules of the modem including a conventional programmable tone detector module 58, a receiver/demodulator/ equalizer module 60 and a INFO$_x$ receiver 62. The modem further includes a receiver initialization and control functional module 64 which initializes and controls the module 60 via the signal path 66. In addition, the tone detect module 58 and initialization and control module 64 are governed by the controller 20 utilizing the path 68. The data output of the receiver module 60 is provided to a conventional decoder descrambler module 70 over the data path 72. The module 70 processes the data received.

Still further, the modem includes a counter 74 which is used to compute the range RTDEc or RTDEa, as the case may be, which will become more evident from the description found below. The counter 74 may be started by the controller 20 using path 76 and stopped by the receiver 60 using path 78.

In the present embodiment, an echo and received signal analyzer 80 operates on the received signals including, where selected, the uncancelled echo signal in certain cases at selected times to estimate channel characteristics and select a communication parameter combination of carrier frequency, symbol rate, transmitter preemphasis filter, transmitter power level and data bit rate under control of the controller 20 via data path 82. The echo and received signal analyzer 80 may be implemented by a Fast Fourier Transform FFT processor. The resulting parameter combination is provided to a TX preemphasis and TX power control processor 84 over the data path 86. In addition, the selected communication parameter of the remote modem are received by the $INFO_x$ receiver 62 and provided to the TX preemphasis and TX power control processor 84 using the path 88. The TX preemphasis and TX power control processor 84 decides the carrier frequency, symbol rate symbol rate, transmitter preemphasis filter, transmitter power level and data bit rate for use by the modem based on estimated characteristics of the receiver channel and the echo channel over which it is communicating with another modem. If the TX preemphasis and TX power control processor 84 cannot find a carrier frequency and symbol rate consistent with a desired maximum and minimum bit rate range set by the controller 20, then it generates an error signal (ERROR). The combined carrier frequency, symbol rate, transmitter preemphasis, transmitter power level and data bit rate information and ERROR signal are all provided from the TX preemphasis and TX power control processor 84 to the controller 20 over the signal path 90 for storage in the memory module 22 thereof.

The foregoing described modem may be controlled to initiate a call and thus, be operated in a call mode (hereinafter referred to as a call modem) or may be controlled to answer a call, and thus, be operated in an answer mode (hereinafter referred to as an answer modem).

An example of operation of the preferred modem embodiment described in connection with the schematic block diagram of FIGS. 5–6 will now be supplied in connection with the communication between a call/answer two wire modem pair which intend to communicate over a communication media such as a leased line (Private) or PSTN line of a telephone network like that described in connection with the network models of FIGS. 1–4, supra.

Figure 8:
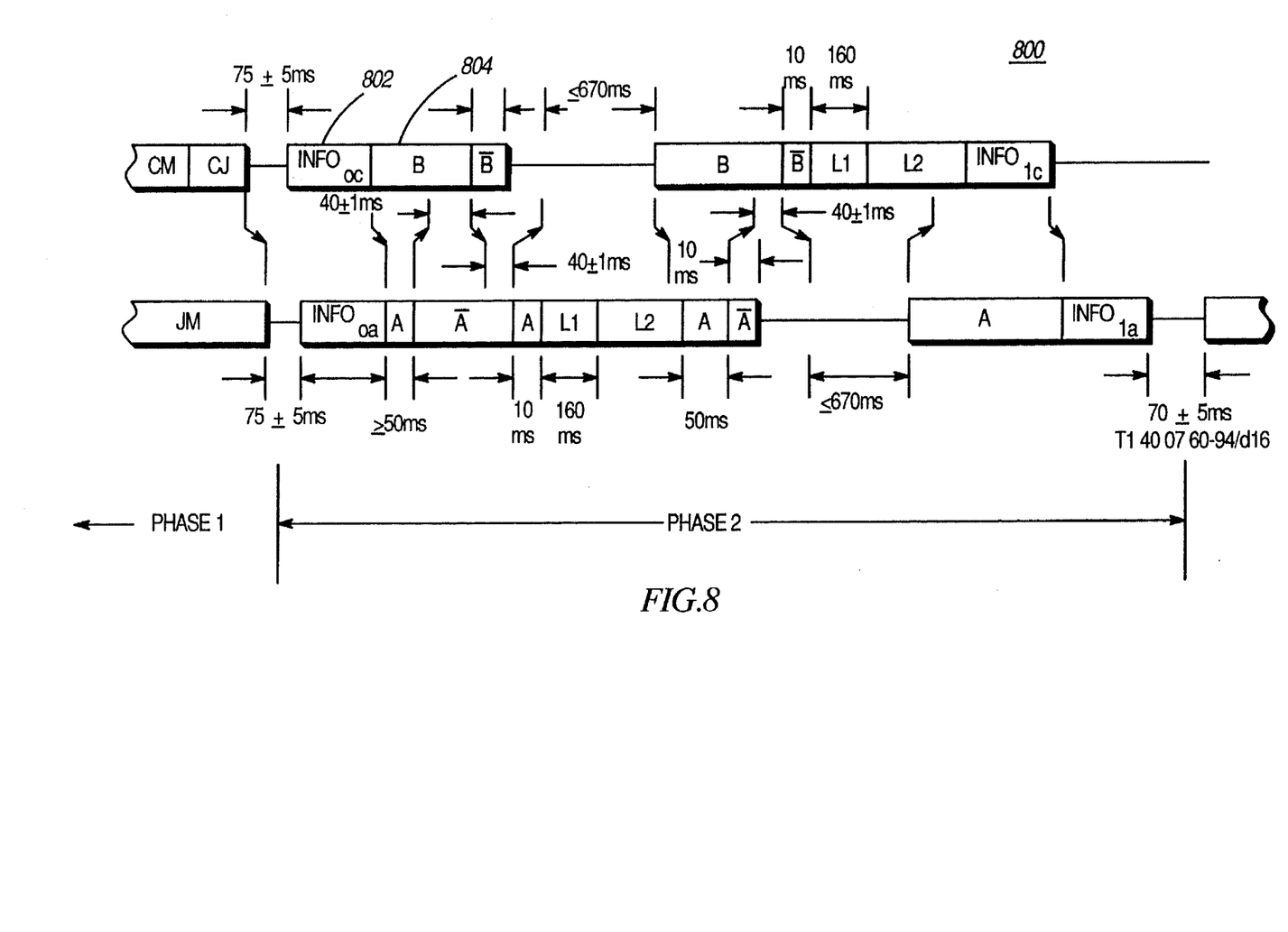
FIG. 8 is a diagram of phase 2 probing/ranging in accordance with V 0.34.
Figure 9:
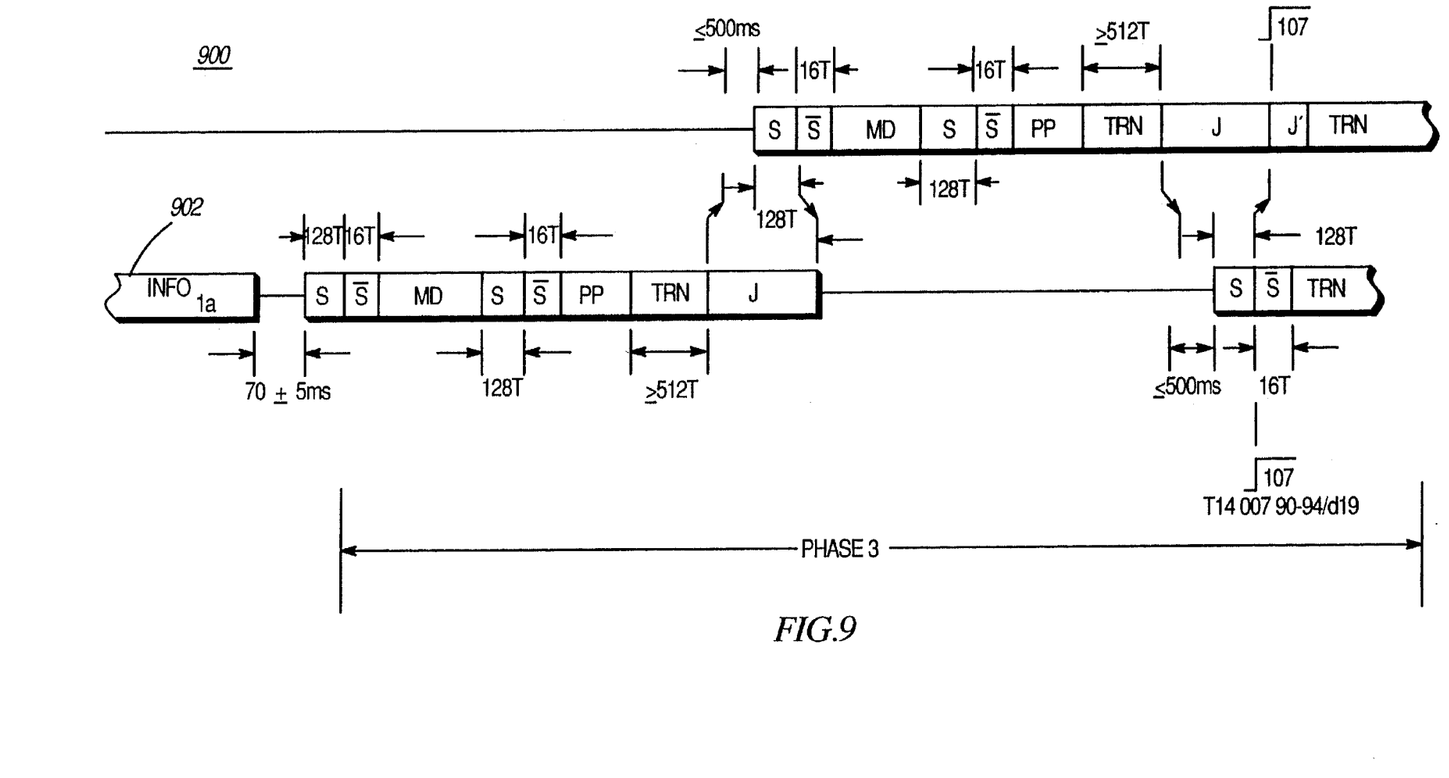
FIG. 9 is a diagram of phase 3 equalizer and echo canceller training in accordance with V 0.34.
Figure 10A:
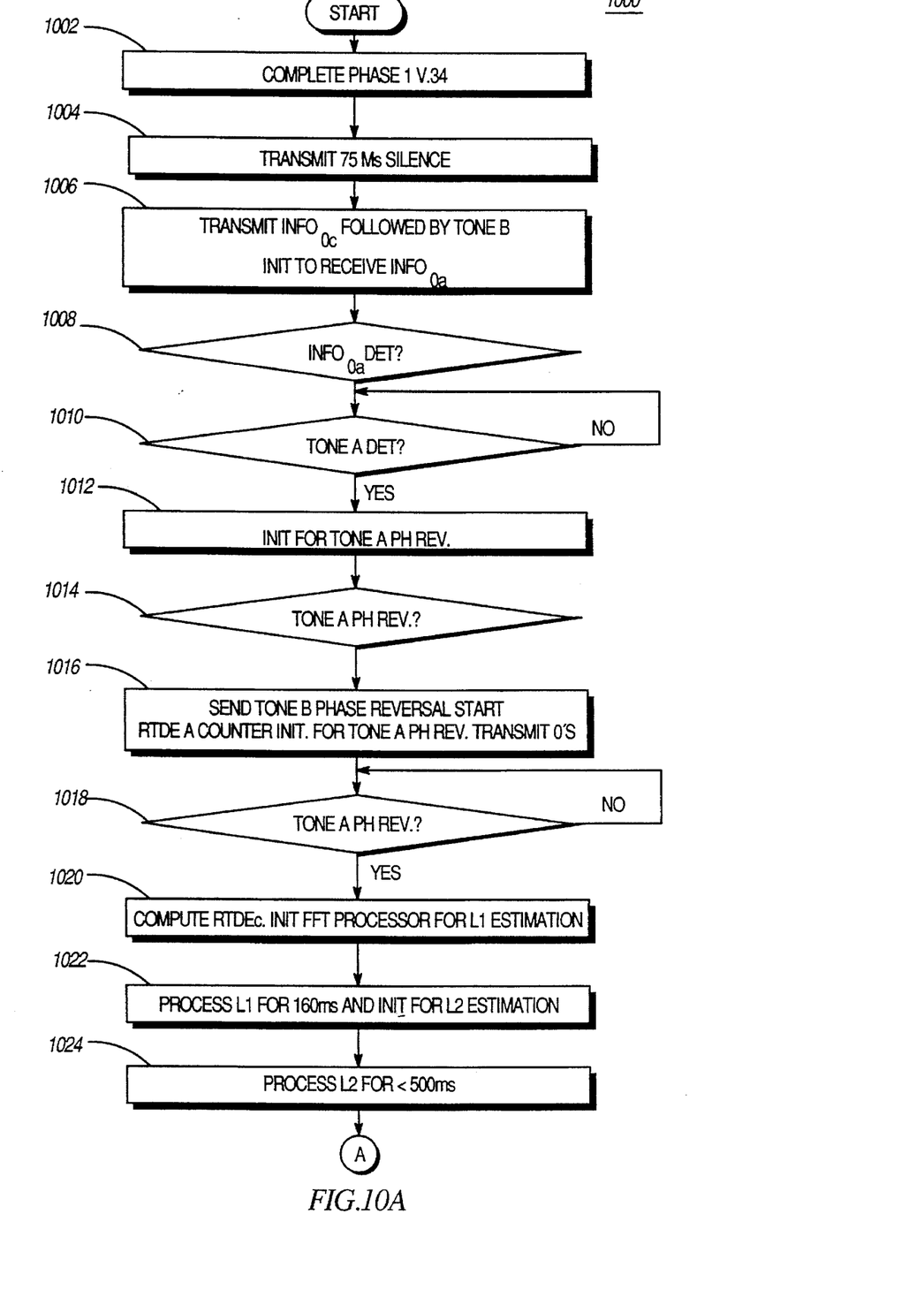
FIG. 10 is a flow chart of one embodiment of steps in accordance with the method of the present invention by a modem operating in a call mode.
Figure 10B:
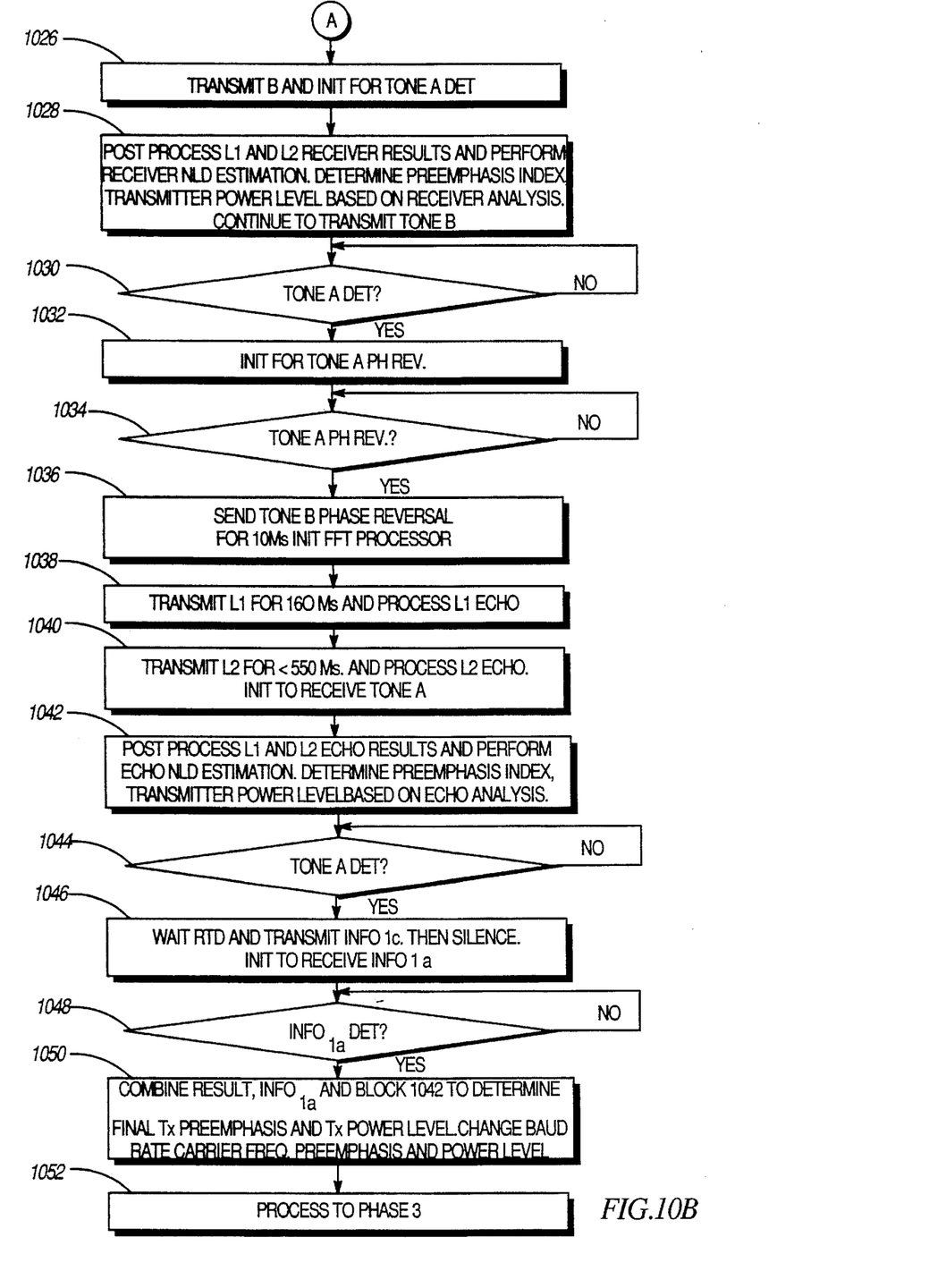

Referring to FIGS. 5,6,8, 9, 10 and 11, a common start up procedure is now described, which includes line probing the telephone line connection communication media between the call and answer modems to learn the channel characteristics and the echo characteristics. After a call is initiated from a call modem, and the answer modem is connected to the line, the call and the answer modems proceed to interwork with each other as recommended by phase 1 1002,1102 with a CM/JM exchange as shown in FIG. 8, as specified by the ITU-T V 0.34 modem recommendation. After the completion of Phase 1 of the handshaking procedure, the call and the answer modems transmit 75 ms of silence (as shown in functional block 1004, 1104). After the transmission of silence, the call modem then proceeds to send Info0c 802 followed by Tone B 804, 1006 as shown in FIG. 5, FIG. 10 using the $INFO_x$ generator 24 and then commences transmitting a Tone B as shown in flowchart block 1006. The controller 20 selects and enables the tone generator 26 to generate a tone at 1200 Hz and controls the switch SW1 to pass the generated tone to the transmitter/modulator 34 which transmits the tone overpath 36 through the hybrid 38 and out over the two wire line 40 to the answer modem. Concurrently, the controller 20 of the call modem initializes the module 58 for the reception of a information sequence INFO0a. At this time, both modems may be set at a predetermined symbol timing, for example, the symbol timing of 2400 Hz.

Figure 11A:
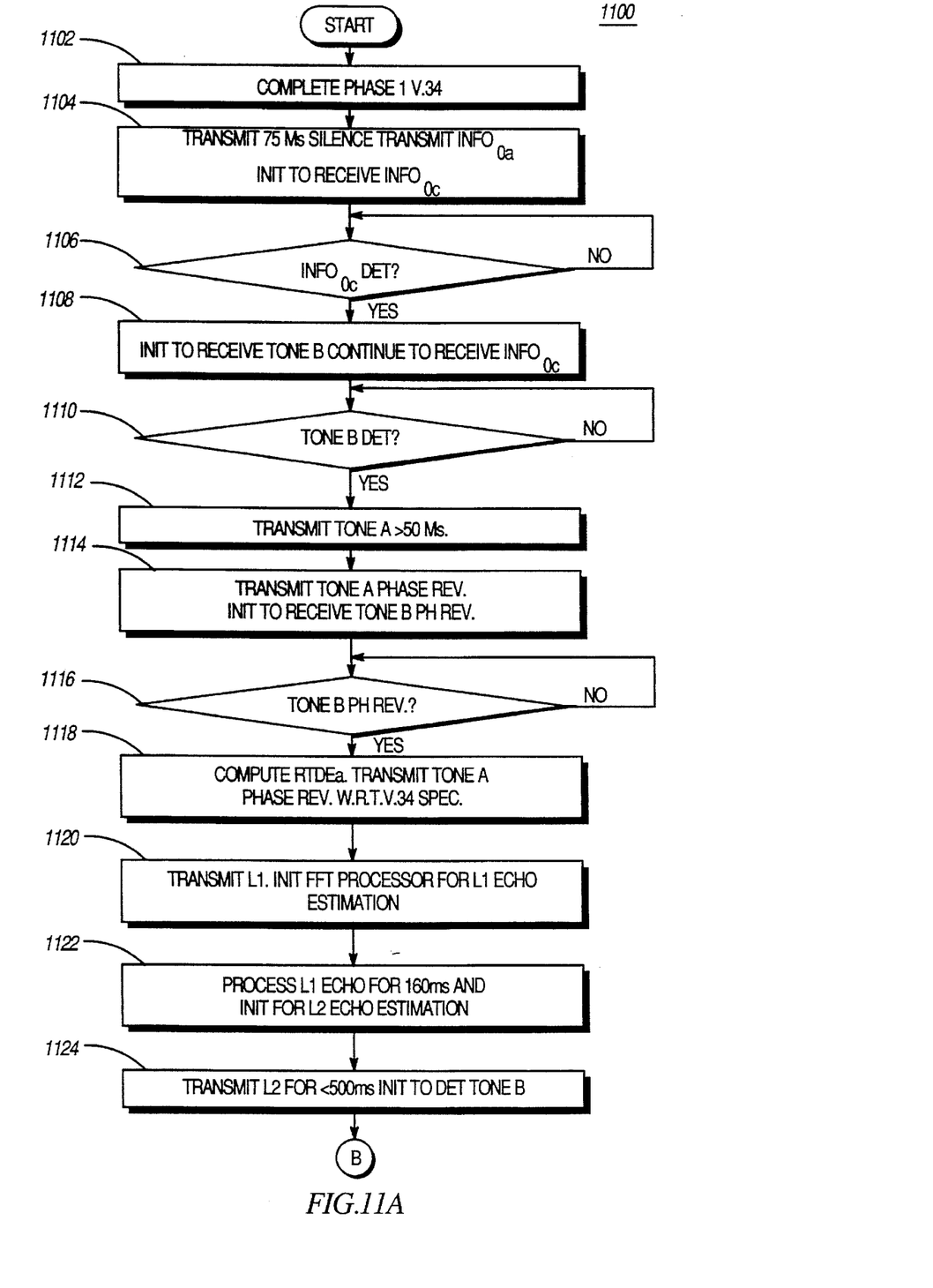
FIG. 11 is a flow chart of one embodiment of steps in accordance with the method of the present invention by a modem operating in an answer mode.
Figure 11B:
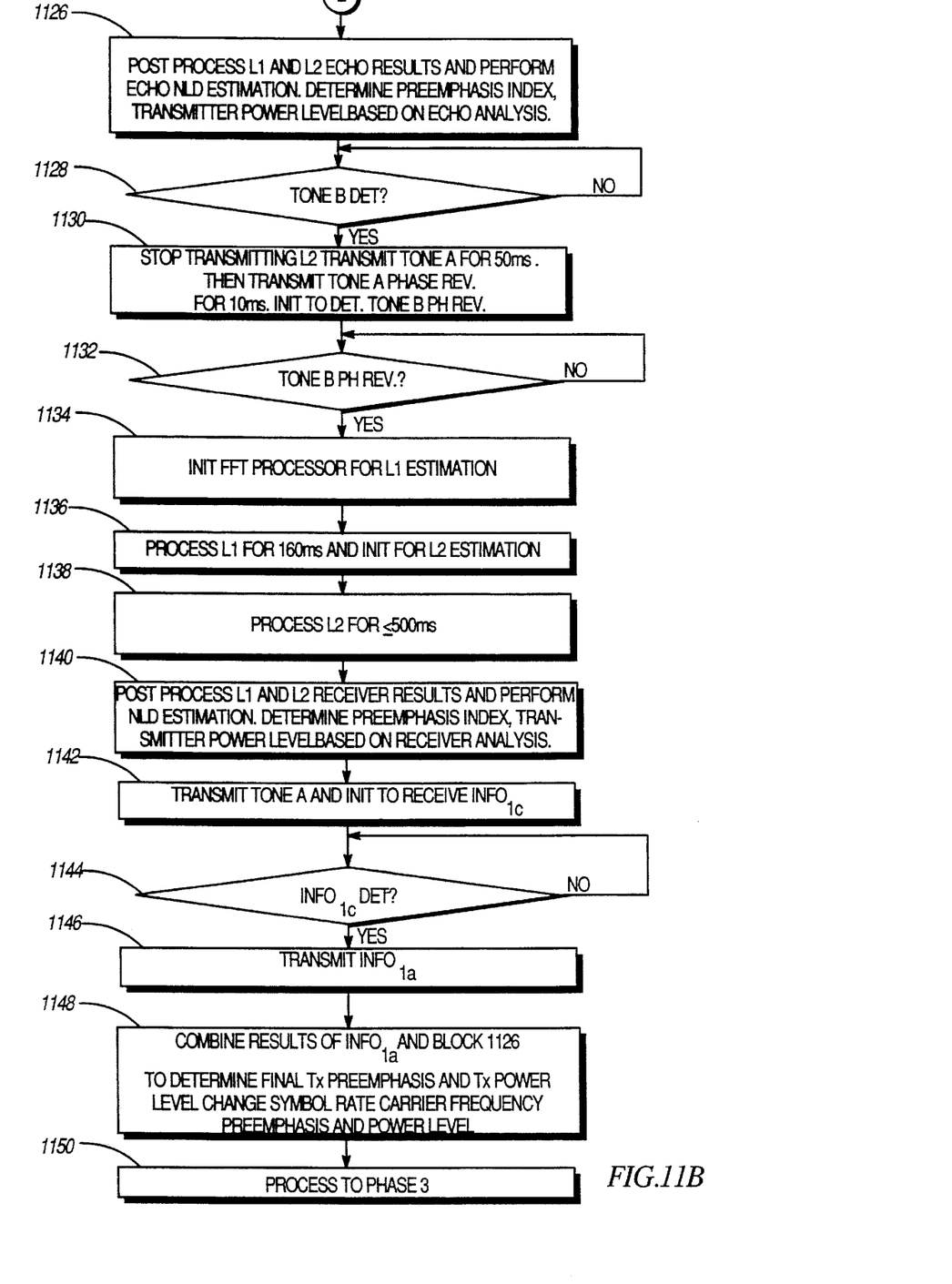

Simultaneously, the answer modem similarly governs the transmission of the information sequence Info0a using block 24 and the 2400 Hz tone using block 26 and initializes its module 62 to receive and detect Info0c according to block 1104. Upon reception of Info0c as detected by the module 62 in accordance with block 1106 the answer modem initializes itself to detect Tone B a 1200 Hz tone from the call modem while continuing to receive Info0c in accordance with block 1108.

Upon detection of INFO0a block 1008 the call modem then looks for Tone A, a 2400 Hz tone using block 58 in block 1010. and then upon detection of Tone A the call modem initializes to detect the first phase reversal of Tone A in Block 1012 (Tone A *) . Upon detection of Tone A * in block 1014 the call modem sends a phase reversal of Tone B (Tone B*) for 10 ms, Concurrently therewith, the controller 20 of the call modem starts the counter 74 to measure the round trip delay RTDEc (block 1016).

Thereafter in the flowchart block 1016, the call modem initializes the detect module 58 to detect the phase reversed Tone A and controls the transmitter 34 to transmit all zeroes. Then looks for the phase reversal Tone A in the decisional block 1018.

After receiving Tone B block 1110, the answer modem starts to send Tone A using block 26 as shown in block 1112 in the flow diagram. After at least 50 ms of Tone A has been transmitted, the answer modem transmits a Tone A phase reversal. Simultaneously, the answer modem initializes its detect module 58 in block 1114 to detect the phase reversal Tone B.

The answer modem then looks for the phase reversal Tone B in the decisional block 1116 and when it receives and detects the Tone B* by the module 58, it executes the flowchart block 1118 which causes the controller 20 to wait for at least 40 +/−1 ms, and then control the tone generator 26 and transmitter 34 to transmit a phase reversal Tone A* ( Tone A) for 10 ms. Thereafter, in the block 1120, the controller 20 of the answer modem initializes the echo and received signal analyzer 80 to compute the channel characteristics estimation resulting from received echo signals of the first line probe signal L1 Simultaneously, the answer modem transmits line probe signal (L) using block 28 and setting gain 29 to +6 dB over nominal transmit level.

In the call modem, when the Tone A phase reversal is detected as determined by functional block 1018, the counter 74 is stopped by the receiver module 60 according to the instructions of block 1020 and the echo and received signal analyzer 80 thereof is initialized to compute an estimation of channel characteristics from a received signal (L1). The resultant digital count of the counter 74 is representative of the round trip delay or range between the two modems and is stored in the memory 22 by the controller 20 for later use in controlling the echo canceller 50.

In the present state, both the call modem and answer modem are initialized to estimate channel, noise characteristics, and as per the current invention the nonlinear distortion characteristics of the echo signal and received signal which is accomplished by one modem transmitting a known line probe signal, such as a chirp signal and, at the same time, receiving the echo signal therefrom, while the other modem at the remote end receives the chirp signal.

In the present embodiment, according to the flowchart block 1120, the controller 20 of the answer modem controls the chirp generator 28, switch SW1 and transmitter 34 to transmit a line probing chirp signal which is a periodic signal comprised of a series of tones spaced at 150 Hz apart within a frequency band of 150 Hz–3750 Hz. Within this frequency band, 4 nulls are transmitted in place of the tones where one measures the nonlinear distortion, if any, introduced by the channel of the communication media. The line probing chirp signal is first transmitted at a high power level L1 (+6 dB over the nominal) for 160 MS 1122 and repeatedly transmitted at the nominal transmit level L2 for up to a maximum of 500 ms 1124 by the answer modem during which time it is receiving echo signals which are conducted to the echo and received signal analyzer 80 and analyzed for estimating echo characteristics including the nonlinear distortion characteristics of the communication media.

During L1 and L2 Line Probes (i.e., the first and second line probes) the non-linearity of the near end echo is measured. The amount of non-linearity specifically in the 4 empty bins (900 Hz, 1200 Hz, 1800 Hz and 2400 Hz) of the Line probe is critical, particularly in determining the relative distortion levels in the 4 empty bins. The transmitter measures the non-linearity of both the modem transformer and the network transformer during both L1 and L2 Line Probes.

Therefore, the residual non-linearity in the 4 empty bins in the Line Probe 900 Hz, 1200 Hz, 1800 Hz and 2400 Hz during L1 block 1120 is measured. The levels present in each of these bins are stored in memory 22 to be compared with the measurement obtained in the measurement of L2 described later. The difference in non-linearity level that exists between the different bins is used to determine the amount of TX preemphasis needed. Secondly, L2 block 1124 is measured in the same 4 bins and a determination in accordance with a predetermined scheme is made whether or not the overall residual echo (non-linearity) requires further TX power control. Thus the final determination in performance of the receiver is made by the local transmitter.

Similarly, the instructions of block 1020 cause the controller 20 of the call modem to activate the echo and received signal analyzer 80 to perform and analyze the received line probing chirp signal from the answer modem for estimating the signal characteristics of the communication media. Each receiving modem estimates its respective media characteristics of the broad band signal by performing the spectral analysis on the first line probing segment L1 (block 1022) for 160 ms and the proceeds perform averaging of the received spectrum for less than 500ms (block 1024). Averaging over the period of time by the echo and received signal analyzer, provides the noise rejection, which cancels out a majority of computation induced noise, leaving behind only the received signal or echo signal linearly and nonlinearly distorted by the channel. The functional block diagram schematic of FIG. 7 shows a series of modules suitable for embodying an echo and received signal analyzer for performing the estimation of signal or echo characteristics of the communication media.

Figure 7:
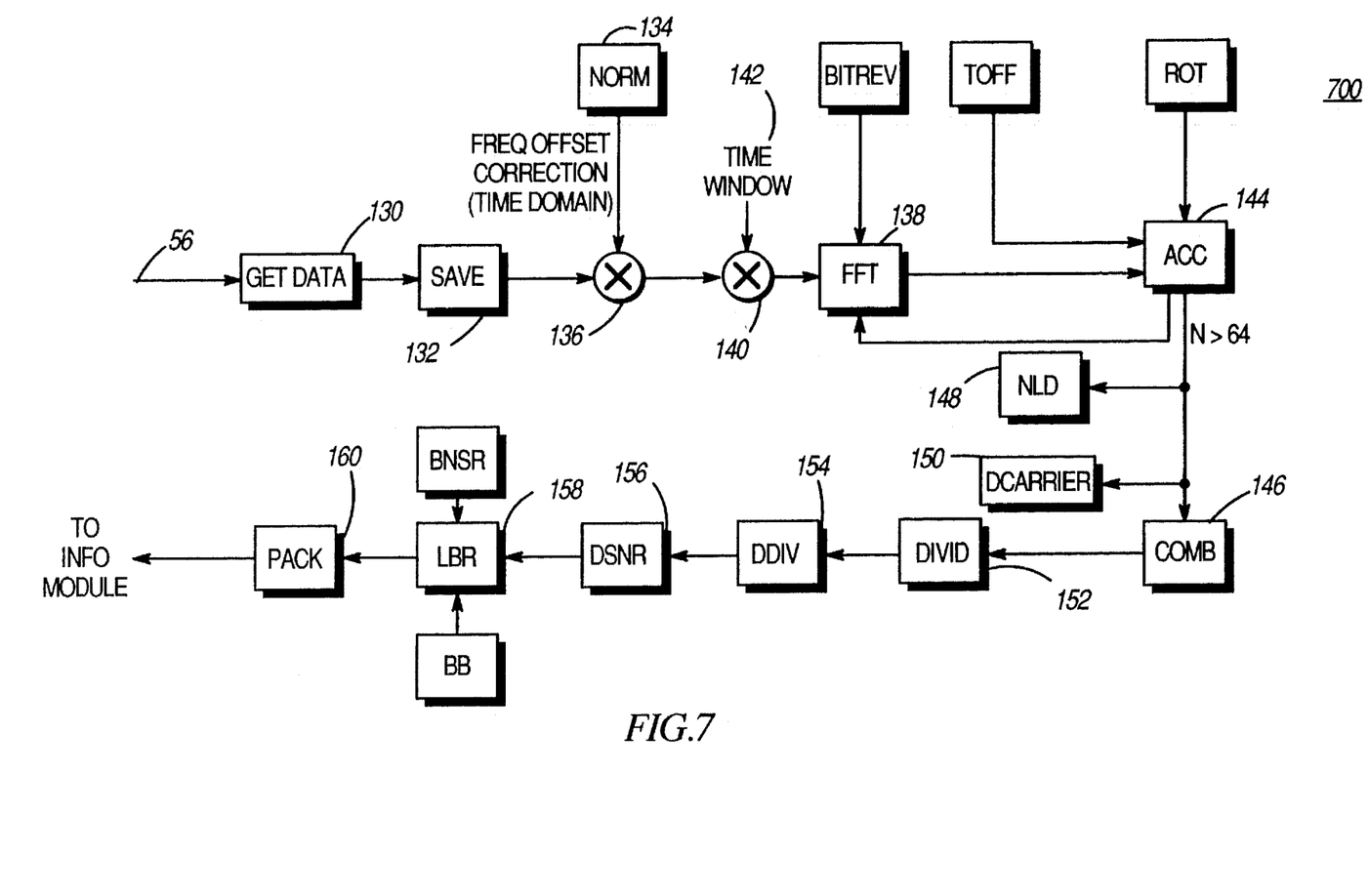
FIG. 7 is a functional block diagram schematic of a series of modules suitable for performing the estimation of signal or echo characteristics of the communication media in accordance with the present invention.

Referring to FIG. 7, the incoming tones of the line probing chirp signal or echo signal thereof, as the case may be, are gathered in the block 130 and saved in a temporary memory buffer according to the functional block 132. Since the channel may introduce a frequency offset which could make the received signal non-periodic, a frequency offset correction is accomplished, using the frequency offset of block 134 and mixer 136, prior to computing the Fourier transform thereof.

A 64 point FFT processing algorithm 138 is used, in the present embodiment to process the L1 segment, for computing the received signal to noise ratio over a predetermined frequency spectrum or a received signal to echo ratio over the same predetermined frequency spectrum. For this computation, 128 time samples or points are gated through the gate 140 at a time as governed by the time window signal 142 to the FFT 138. A power signal spectrum is computed for multiple periods over the 160 ms interval by the FFT processor 138 and stored in an accumulator 144. A timing offset correction TOFF and a frequency offset correction ROT are introduced to each result out spectrum. The individual spectrums are then averaged to yield an overall resultant spectrums to either reduce or eliminate random noise. Also in block 144, the resultant average power spectrum is squared to yield a squared spectrum which is subtracted from the original spectrum to yield a channel noise spectrum. The output of the block 144 provides both a signal power spectrum and a noise power spectrum to a combiner block 146.

The nonlinear distortion introduced by the channel is also measured in block 148 by averaging the energy at the null points of the signal spectrum which were introduced by the line probing signal as explained above.

Similarly the processing is repeated to process the segment L2, but the processing is continued for a predetermined time that is longer than that used for L1, to obtain accurate signal to noise measurements. A block 150 is used to hunt for an optimum carrier frequency based on the resultant spectra.

Since the goal of the FFT processor is to maximize the data bit rate for a particular channel according to the estimated characteristics thereof, the number of bits per symbol that can be transmitted through the channel and received by the modem receiver for a given BER is calculated. A 2-tap DFE model is constructed and based on the channel noise spectrum, the noise at the output of the DFE model, for unit signal is also calculated. The DFE model (linear) noise, the nonlinear noise and the signal level of the various spectrums are weighted and combined in block 146 to obtain the total noise at the input of the receivers decoder. The signal to noise ratios are established in blocks 152 and 154. In block 156, the total noise including distortion above the received and echo signals are computed and scaled to unity. In block 158, the bits/symbol is then computed from a Fourier series approximation of the decoders signal to noise ratio. Resulting from block 158 is an optimum carrier frequency symbol rate, and data bit rate within the desired data bit rate range provided from the controller 20. In block 160 the resultant information is packed in a particular format for providing it to the other modem as will be fully understood from the description herebelow.

In the decision logic block 84, a final decision algorithm selects between the selected and received parameters of carrier frequency, symbol rate, tentative transmitter preemphasis and tentative power level for the answer modem and the actual transmit preemphasis and the actual power level that will be requested by the call modem.

After the answer modem completes the L1 and L2 segments of the line probing signal generation, thereafter, the controller 20 of the answer modem initializes the module 58 for the detection of the Tone B. The answer modem then proceeds to post-process the results of the L1 and L2 echo analysis and performs the NLD (non-linear distortion) measurements, determines the tentative TX preemphasis and the transmitter power level based on the echo measurements 1126. It then waits for the detection of Tone B from the call modem (instruction block 1128). Upon detection of Tone B from the call modem, the answer modem completes the instructions of block 1130 by disabling the chirp generator 28 and controls the tone generator 26, switch SW1 and transmitter 34 to commence transmission of the Tone A for 50 ms. and continues to transmit Tone A phase reversal for 10 ms. In addition, the answer modem initializes its phase reversal detector to detect Tone B phase reversal using module 58. In the meantime, after the call modem completes the channel estimation of block 1022, 1024 for the received line probing signal, the controller 20 in response to the instructions of block 1026 transmits Tone B and initializes the module 58 for the detection of Tone A (block 1026) and then post-processes L1 and L2 receiver results, performs NLD estimation, determines the preemphasis index and the transmitter power level based on the receiver analysis (block 1028). After the detection of Tone A in block 1030, the call modem then initializes block 58 to detect Tone A phase reversal in block 1032. During this time, the call modem continues transmission of Tone B. Upon detection of the Tone A phase reversal by the module 58, in instructional block 1034 the controller 20 of the call modem terminates the transmission of Tone B and transmits Tone B phase reversal for 10 ms and initializes the echo and received signal analyzer for performing echo analysis according to instruction block 1036 by controlling the tone generator 26, switch SW1 and transmitter 34.

The detection of Tone B phase reversal by the answer modem (block 1132) causes the receiver 60 thereof to stop the counter 74, and the controller 20 to initialize the echo and received signal analyzer 80 thereof to perform a channel estimation based on the received line probing chirp signal (block 1134).

Concurrently, the controller 20 of the call modem initializes its echo and received signal analyzer to perform an estimation of channel characteristics based on received echo signal or signals.

In blocks 1038 and 1040, 1136 and 1138 the same line probing process is performed as described supra except that the call modem now is transmitting the line probe chirp signals L1 and L2 and performing the estimated channel characteristics based on the echo signal thereof and the answer modem is performing the estimation of a channel characteristics based on the received line probing chirp signal. In the present embodiment, this channel estimation line probing procedure takes approximately 160 ms for processing L1 and <500 ms + one round trip delay to process L2. The same post processing (1140, 1042) is done as described supra in blocks 1028 and 1126 except the context of the signals is reversed (1044, 1046, 1048). Then (in block 1050) the results of INFO$_{1A}$, the post-processing of L1 and L2 echo results, the echo NLD estimation, the determination of a preemphasis index and transmitter power level based on echo analysis (block 1042) are combined in accordance with a predetermined scheme to change the baud rate, carrier frequency, preemphasis filter and power level. Phase 3 is then entered 1052.

After performing the second line probing task, the selected carrier frequency, symbol rate, transmitter preemphasis, transmitter power level and data bit rate of each of the call and answer modems are provided to their respective controller 20 which in turn selects and enables the respective Info$_x$ generator 24 to generate the learned information in packets or frames to the other modem via switch SW1 and transmitter 34 as recommended by ITU-T recommendation V 0.34.

In the present embodiment, a 600 symbol DPSK modulation scheme is used to exchange the communication parameter information between the call and answer modems. A carrier frequency of 1200 Hz is used for DPSK transmission as recommended by ITU-T V 0.34 recommendation.

After post-processing the received signal-based results, the answer modem transmits Tone A and initializes its receiver block 62 to receive the INFO$_{1c}$ information (block 1142) Concurrently, the call modem waits to detect Tone A, and after the detection of Tone A (block 1044), the modem waits for the duration of one round trip delay and transmits INFO$_{1c}$.

After the answer modem detects INFO$_{1c}$ signal according to block 1144, the instructions of block 1146 are then executed, instructing the controller 20 to cease transmitting Tone A and start to transmit the INFO$_{1a}$ 902. Before the transmission of InfO$_{1a}$ the final decision of the transmitter preemphasis filter selection and the transmitter power level is determined by combining the results obtained in block 1126 with the request from the call modem sent in INFO$_{1c}$. After transmission of one frame of Info$_{1a}$ the answer modem ceases to transmit INFO$_{1a}$ and goes to an idle state for approximately 20 predetermined periods (20T) and then changes its carrier frequency and symbol rate, transmitter preemphasis and transmitter power level to the one recommended by the preceding procedure (block 1148).

After the reception of InfO$_{1a}$ the call modem makes the final decision of the transmitter preemphasis filter selection and the transmitter power level by combining the results obtained in block 1042 with the request from the answer modem sent in INFO$_{1a}$ and goes to an idle state for approximately 20T and then changes its carrier frequency and symbol rate, transmitter preemphasis filter and transmitter power level to the one recommended by the preceding procedure (block 1050).

The modems then proceed to execute the next steps 1052, 1150 respectively. The next portion of the start up procedure (see FIG. 9) is a training sequence for training the receiver and echo canceller of each of the call and answer modems. This training sequence is considered well-known and is outlined in the ITU-T V 0.34 specifications and not considered in any way a part of the present invention, except that the training sequences are performed based on the recommended carrier frequency and symbol rate transmit preemphasis filter and at the recommended transmitter power level learned from the preceding portion of the start up procedure described in connection with FIG. 8. Thus, this procedure will not be described here. The procedure is primarily that currently being used in the modem 3260 fast marketed by Motorola, Inc./Codex Corporation. Portions of the procedure are also described in the U.S. Pat. No. 4,987,569 issued Jan. 22, 1991 and assigned to the same assignee as the present application.

We claim:

1. A two-wire modem for, upon transmitting, for a first predetermined time segment, a first line probing signal of varying frequency content and varying power level/levels over communication media, selecting a carrier frequency and a symbol rate from a predetermined plurality of carrier frequencies and symbol rates, a transmitter preemphasis filter and a transmitter power level determined from estimated characteristics of said communication media, to communicate with another modem over said communication media in a full duplex mode, said two-wire modem comprising:

A) an echo and received signal analyzer for:
 receiving at least one echo signal of said first line probing signal of varying frequency content and varying power level/levels from said communication media in said first predetermined time segment and estimating echo characteristics of said communication media based on an analysis of said received at least one echo signal of said first line probing signal; and receiving a second line probing signal of varying frequency content and varying power level/levels from said communication media in a second predetermined time segment and estimating signal characteristics of said communication media based on an analysis of said received second line probing signal, and B) a TX preemphasis and TX power control processor, operably coupled to the echo and received signal analyzer, for selecting said carrier frequency and symbol rate from the predetermined plurality of carrier frequencies and symbol rates, the transmitter preemphasis filter from the plurality of predetermined transmitter preemphasis filters, and the transmitter power level using said estimates of the signal and echo characteristics of said communication media.

2. The two-wire modem in accordance with claim 1 wherein the echo and received signal analyzer further computes a signal-to-noise ratio over a predetermined frequency spectrum from said received second line probing signal and echo signal distortion over the predetermined frequency spectrum from said received at least one echo signal; and wherein said TX preemphasis and TX power control processor further determines at least one desirable communication frequency band of the communication media within the predetermined frequency spectrum based on the computed signal-to-noise ratio and echo signal distortion, selects the carrier frequency and symbol rate based on said at least one desirable communication frequency band and selects at least one transmitter preemphasis filter and one transmitter power level.

3. The two-wire modem in accordance with claim 2 wherein the at least one transmitter preemphasis filter and one transmitter power level are selected utilizing a Fast Fourier Transform, FFT, processor.

4. The two-wire modem in accordance with claim 1 wherein the TX preemphasis and TX power control processor estimates the signal characteristics including non-linear signal distortion of the communication media.

5. The two-wire modem in accordance with claim 1 wherein the echo and received signal analyzer estimates the echo characteristics including non-linearities in at least one echo path of the first line probing signal in the communication media.

6. The two-wire modem in accordance with claim 1 wherein the first and second line probing signals include a chirp signal ranging from a first frequency to a second frequency which is repeated a plurality of times over said respective first and second predetermined time segments; and wherein an average of the signal characteristics is estimated based on an analysis of the repetitive chirp signal of the second line probing signal and an average of the echo characteristics is estimated based on an analysis of the repetitive chirp signal of the echo of the first line probing signal.

7. The two-wire modem in accordance with claim 1 including selecting, by the two-wire modem, the carrier frequency and symbol rate, transmitter preemphasis filter and transmitter power level based also on at least one desired data bit rate.

8. The two-wire modem in accordance with claim 7 including receiving information from the other modem, said information including a carrier frequency, a symbol rate and a data bit rate at which the other modem expects to communicate, and deciding which of the selected and received carrier frequency, symbol rate and data bit rate will be used by the two-wire modem in communicating with the other modem over the communication media.

9. A method for, upon transmitting by a two-wire modem, for a first predetermined time segment, a first line probing signal of varying frequency content and varying power level/levels over a communication media, selecting a carrier frequency and a symbol rate from a predetermined plurality of carrier frequencies and symbol rates, a transmitter preemphasis filter and a transmitter power level determined from estimated characteristics of said communication media, to communicate with another modem over a communication media in a full duplex mode, said method comprising the steps of:

A) receiving, by an echo and received signal analyzer, at least one echo signal of said first line probing signal of varying frequency content and varying power level/ levels from said communication media in said first predetermined time segment and estimating echo characteristics of said communication media based on an analysis of said received at least one echo signal of said first line probing signal;

B) receiving, by the echo and received signal analyzer a second line probing signal of varying frequency content and varying power level/levels from said communication media in a second predetermined time segment and estimating signal characteristics of said communication media based on an analysis of said received second line probing signal and for receiving at least one echo signal of said first line probing signal, and C) selecting, by a TX preemphasis and TX power control processor, said carrier frequency and symbol rate from the predetermined plurality of carrier frequencies and symbol rates, the transmitter preemphasis filter from the plurality of predetermined transmitter preemphasis filters, and the transmitter power level using said estimates of the signal and echo characteristics of said communication media.

10. The method in accordance with claim 9 including:

A) computing a signal-to-noise ratio over a predetermined frequency spectrum from said received second line probing signal and echo signal distortion over the predetermined frequency spectrum from said received at least one echo signal;

B) determining at least one desirable communication frequency band of the communication media within the predetermined frequency spectrum based on the computed signal-to-noise ratio and echo signal distortion, C) wherein said selecting further selects, the carrier frequency and symbol rate and at least one transmitter preemphasis filter and one transmitter power level based on said at least one desirable communication frequency band.

11. The method in accordance with claim 10 wherein selecting at least one transmitter preemphasis filter and one transmitter power level includes utilizing a Fast Fourier Transform, FFT, processor for said selecting.

12. The method in accordance with claim 9 further including estimating, by the TX preemphasis and TX power control processor, the signal characteristics including non-linear signal distortion of the communication media.

13. The method in accordance with claim 9 further including estimating, by the echo and received signal analyzer, the echo characteristics including non-linearities in at least one echo path of the first line probing signal in the communication media.

14. The method in accordance with claim 9 wherein the first and second line probing signals include a chirp signal ranging from a first frequency to a second frequency which is repeated a plurality of times over said respective first and second predetermined time segments; and wherein the estimating means estimates an average of the signal characteristics based on an analysis of the repetitive chirp signal of the second line probing signal and estimates an average of the echo characteristics based on an analysis of the repetitive chirp signal of the echo of the first line probing signal.

15. The method in accordance with claim 9 further including selecting the carrier frequency and symbol rate, transmitter preemphasis and transmitter power control based also on at least one desired data bit rate.

16. The method in accordance with claim 15 further including receiving information from the other modem, said information including a carrier frequency, a symbol rate and a data bit rate at which the other modem expects to communicate, and determining which of the selected and received carrier frequency, symbol rate and data bit rate will be used by the two-wire modem in communicating with the other modem over the communication media in accordance with a predetermined scheme.

\* \* \* \* \*